APPARATUS FOR ELECTRICAL COMPONENTS

Filed Nov. 14, 1966

Inventor:
William S. Bradfield
by Howson & Howson
Attys.

Inventor:
William S. Bradfield
by Howson & Howson
Attys.

United States Patent Office 3,420,381

Patented Jan. 7, 1969

3,420,381

APPARATUS FOR ELECTRICAL COMPONENTS

William S. Bradfield, Downingtown, Pa., assignor to General Communications Products, Inc., Feasterville, Pa., a corporation of Pennsylvania Filed Nov. 14, 1966, Ser. No. 593,865

U.S. Cl. 211—26 2 Claims

Int. Cl. A47f *7/00;* H02b *1/06*

ABSTRACT OF THE DISCLOSURE

This application discloses apparatus generally known as a relay rack for mounting multiple banks of electrical components within a framework. One bank of components is mounted on a gate hinged along one side of the framework and normally spaced forwardly from the framework so that the rear portions of the components project toward the hollow interior of the framework for storage, the gate being adapted to be swung outwardly to expose the rear portions of the bank of components for initial installation and servicing. A second bank of components is mounted on mounting means supported on the rear of the framework by brackets so that the rear portions of the components in the bank likewise project toward the interior of the framework for initial installation and servicing when the gate is swung out.

The present invention relates to improved apparatus for mounting multiple banks of electrical components and has particular application to apparatus for mounting relays, switches, and similar components of telephone and computer networks.

Previous apparatus of this nature consisted of individual frameworks for each bank of components wherein each framework included a displaceable support on which the bank of components was mounted. In order to install and service the components, the support was displaced from the framework to afford access to the components and their connections to the wire harnesses which connect the components into the overall network. In installations wherein the separate banks of components cooperate with one another, it is frequently necessary to have two or more banks of components available for servicing or testing at the same time. This, in turn, has required that the supports for the two banks be displaced from their respective frameworks with the resultant inconvenience of working at two separate locations.

In addition, the use of a separate framework for each bank of components has required a substantial amount of floor space in order to provide accessibility to the components for servicing and/or testing the same. In locations where computer and telephone networks of the type to which the application is particularly adapted are used, floor space is at a premium, and it is therefore desirable to minimize the use of floor space for mounting components while providing easy accessibility and low installation cost.

With the foregoing in mind, the present invention provides apparatus wherein multiple banks of components are supported in a single framework in such a manner that two or more banks may be serviced simultaneously at a single location.

Another object of the present invention is to provide apparatus for mounting multiple banks of components which minimizes the floor space and enables a compact disposition of the banks, thereby reducing the cabling expense while providing the desired accessibility for servicing and/or testing of the components.

More specifically, the present invention provides a relay rack having a gate at the front thereof on which one bank of components may be mounted and mounting means at the rear thereof on which a second bank of components may be mounted, the rear portions of the components from both banks projecting inwardly toward the framework so that when the gate is opened, the rear portions of both banks are exposed for installation and/or servicing from a single location.

All of the objects of the invention are more fully set forth hereinafter with reference to the accompanying drawing wherein.

Referring now to the illustrated embodiment of the invention, the mounting apparatus therein is a relay rack having two gates on the front thereof for mounting two banks of components and two brackets on the rear thereof for mounting an additional two banks of components, whereby the entire rack is capable of mounting four banks of components. The components are normally affixed to mounting plates which extend across the full width of the rack and are designed to be mounted in a series along the height of the rack.

Figure 1:
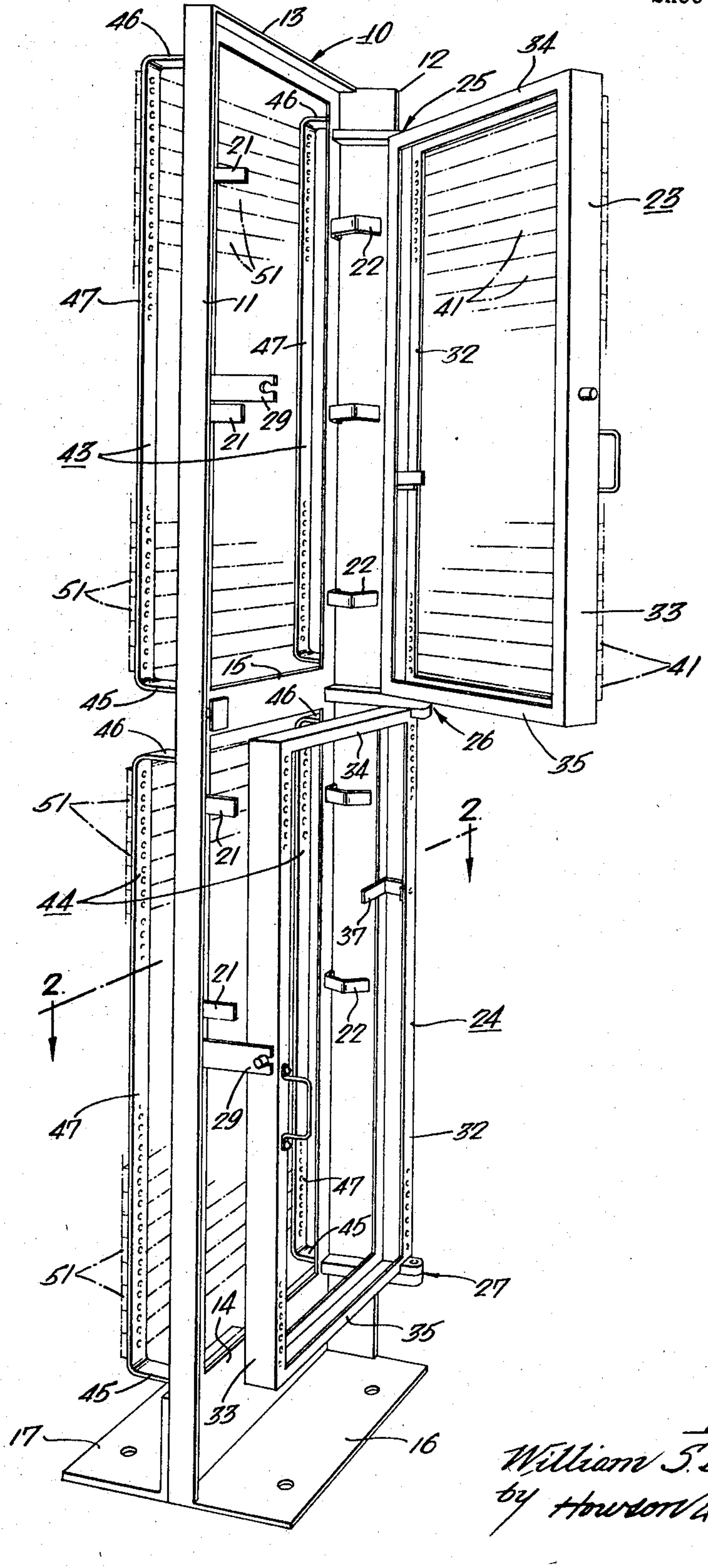
FIG. 1 is a perspective view of mounting apparatus made in accordance with the present invention.

Referring now to FIG. 1, the rack comprises a hollow framework 10 having a pair of uprights 11 and 12 interconnected by a top cross piece 13, a bottom cross piece 14, and an intermediate cross piece 15. Floor supports are provided on opposite sides of the cross piece 14 as indicated at 16 and 17 to support the rack in the upright position shown. In the present instance, the upright 11 is relatively narrow in depth whereas the upright 12 is relatively wide.

Means are provided to mount multiple banks of components on the framework in a compact array. To this end, on the front of the framework 10, upper and lower gates 23 and 24 respectively are pivoted to the framework 10 by means of hinge elements 25, 26, and 27 projecting forwardly from the wide upright 12. The hinged connection of the gates 23 and 24 to the upright 12 permits the gates to swing between a closed position (see gate 24) wherein the gate is disposed in spaced parallel relation to the framework on the forward side thereof, and an open position (see gate 23) wherein the gate is disposed at an angle to the framework. A latch and keeper assembly 29 is provided to latch each gate in the closed position. Each gate is of hollow rectangular form having side members 32 and 33 and cross members 34 and 35. It should be noted that the hinge members 25, 26, and 27 provide a pivotal connection to the side member 32 of the gates adjacent the forward face of the gates so that when the gates swing open, they remain within the confines of the framework 10 and do not project outwardly into overlapping relation with any structure adjoining the framework. In this manner, a series of frameworks may be mounted in aligned relation and the gates on each framework of the series may be opened without interference with the access to the adjacent framework.

Figure 2:
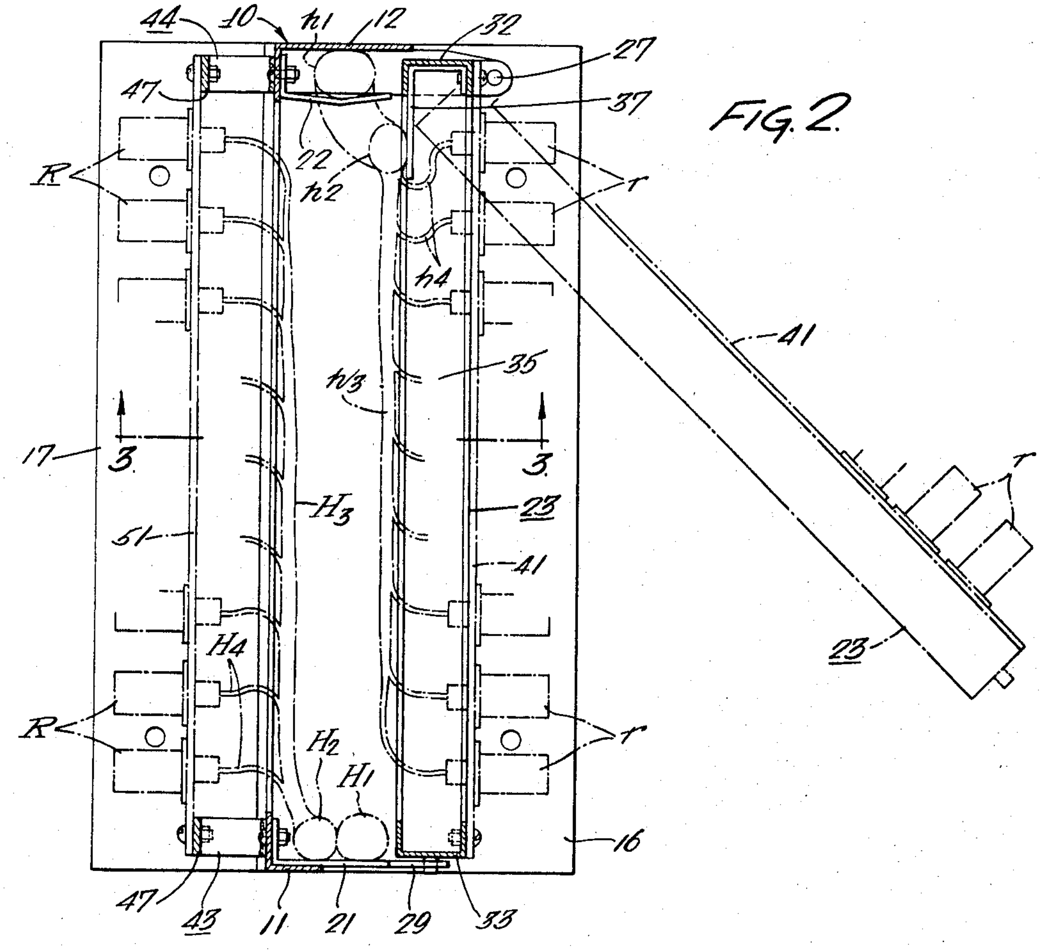
FIG. 2 is a sectional view taken on the line 2—2 of FIG. 1, showing the components and wiring harnesses in broken lines.
Figure 3:
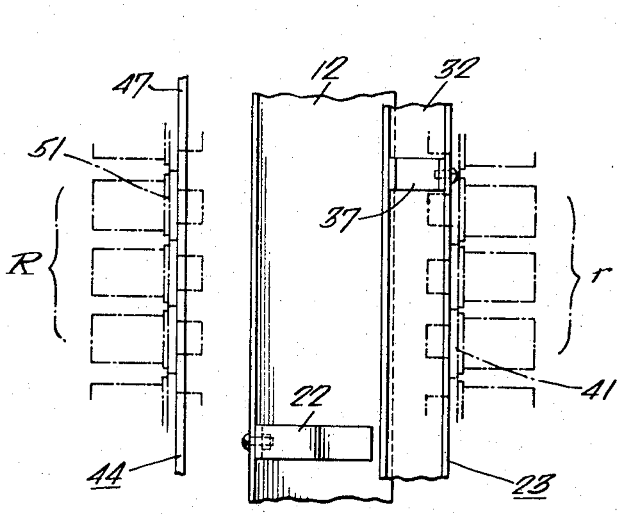
FIG. 3 is a sectional view taken on the line 3—3 of FIG. 2.

The components are mounted on the gate by means of conventional mounting plates shown in broken lines at 41, which span between the side members 32 and 33 and are secured thereto by suitable fasteners. The mounting plates are designed to mount thereon the desired components *r* and in the normal installation, the entire gate is filled with mounting plates so that the gate serves to support an entire bank of components. As shown in FIG. 2, the lead wires for the components on the gates are preferably contained in a wiring harness which is introduced into the framework 13 from the top along the upright 12, and extends downwardly as indicated at *h*–1 along the upright 12 and is secured in place by cable retainers 22. At the lower hinge for the gate, the cable is passed onto the gate and then extends upwardly along the side member 32 of the gate as indicated at *h*–2 and is secured thereto by a cable retainer 32. At each mounting plate, the lead wires for the components on the plate extend therealong as indicated at *h*–3 and are connected to the individual componets *r* as indicated at *h*–4. The wiring connections which are in the rear portion of the components project inwardly toward the frame 13 when the gate 23 is closed, the spacing between the gate 23 and the frame being sufficient to accommodate the inwardly projecting rear portions of the components and the lead wires which extend along the mounting plate for the components, as shown in FIG. 2.

In accordance with the invention, means is provided to mount additional banks of components at the rear of the framework 10. To this end, mounting brackets are mounted in pairs on the opposite side of the framework from the gates 23 and 24 as indicated at 43 and 44 respectively. The upper pair 43 of mounting brackets are constructed identically to the lower pair 44 and consist of U-shaped members having legs 45 and 46 secured to the rear of the uprights 11 and 12 and runners 47 extending substantially parallel to the uprights 12. Mounting plates, indicated in broken lines at 51, span between the runners 47 and serve to mount components R on the brackets 43 and 44 with their rear connecting portions facing inwardly toward the framework. In this way, when installing the apparatus, the wiring harnesses may be mounted within the framework 10 and connected to the components therein. Preferably, the main cable extends downwardly from the top of the framework along the upright 11 as indicated at H–1 and is secured thereto by cable retainers 21 and the lead wires for each bank are doubled back as indicated at H–2 and secured also by the cable retainers 21. At the individual mounting plates 51, the lead wires branch out from the cable as indicated at H–3 and are connected to the components R thereon as indicated at H–4. Thus, the connections to the various components in the bank are within the framework 10 and are readily accessible for servicing and/or testing when the gates are swung outwardly. This arrangement provides a compact unit in normal use and storage, but provides access to both the forward and rearward banks when the gates are opened for servicing and/or testing.

Although the invention has been described in connection with a two-bay relay rack, it is apparent that it is equally applicable to single-bay racks and multiple-bay racks. The spacing of the runners 47 from the framework 10 and the spacing of the gate from the frame may be varied to accommodate components and wiring harnesses of differing dimensions, bearing in mind the desire to avoid interference between the wiring for the rear-mounted components and the wiring for the front-mounted components. In the illustrated embodiment of the invention, the uprights 11 and 12 and the cross piece 13 are in the form of angles, and the cross pieces 14 and 15 are in the form of flat plates, but other forms of structural members may be employed. Likewise, although it is preferred to form the side and cross members of the gates of channel pieces, it may be desired to utilize other structural members in the fabrication of the gates.

While a particular embodiment of the present invention has been herein illustrated and described, it is not intended to limit the invention to such disclosure, but changes and modifications may be made therein and thereto within the scope of the following claims:

I claim:

1. Apparatus for mounting multiple banks of electrical components having rear portions for connection to a wiring harness, comprising in combination:

a hollow rectangular framework having side uprights and top and bottom cross pieces having means for mounting cables of lead wires within the confines of said framework, support means for mounting said framework in an upright position, a gate coextensive in width with said framework and having side members of substantial depth and cross members mounting said side members in spaced parallel relation to provide a hollow rectangular form, and means for mounting a plurality of component mounting plates in a bank on the outer face of said hollow rectangular form whereby the components project outwardly from said face and their rear portions and lead wire connections are disposed inwardly of said plates within the confines of said hollow form, hinge means along one of said side uprights pivotally supporting said gate in front of said framework for swinging movement between a first position parallel to said framework whereby the rear portions of said components within the confines of said gate project toward the hollow interior of said framework, and a second position at an angle to said framework to expose said rear portions for servicing, and brackets mounted on said framework and projecting rearwardly therefrom along the side uprights and having runners in spaced parallel relation to said framework for mounting a second bank of component plates on the outer face thereof with the rear portions of the component facing inwardly toward the interior of said hollow framework for servicing when said gate is in said second position whereby both of said banks may be serviced simultaneously, said runners being spaced from said framework a depth corresponding to the depth of said gate side members so that the rear portions and the lead wire connection of the components are disposed between said runners and said framework.

2. Apparatus according to claim 1 wherein said hinge means provides a pivotal connection to said gate adjacent the forward face of said gate whereby said gate swings within the confines of said framework.

References Cited

UNITED STATES PATENTS

| | | | |
|---|---|---|---|
| 2,185,562 | 1/1940 | Nielsen | 317—101 |
| 2,817,444 | 12/1957 | Brandell | 211—169 X |
| 2,895,087 | 7/1959 | Lieb et al. | 317—101 |
| 2,922,081 | 1/1960 | Dubin | 317—101 |
| 3,317,798 | 5/1967 | Chu et al. | 317—100 |

FOREIGN PATENTS 366,874 3/1963 Switzerland.

ROY D. FRAZIER, *Primary Examiner.*

U.S. Cl. X.R.

211—169; 317—119